United States Patent Office 3,177,430
Patented Apr. 6, 1965

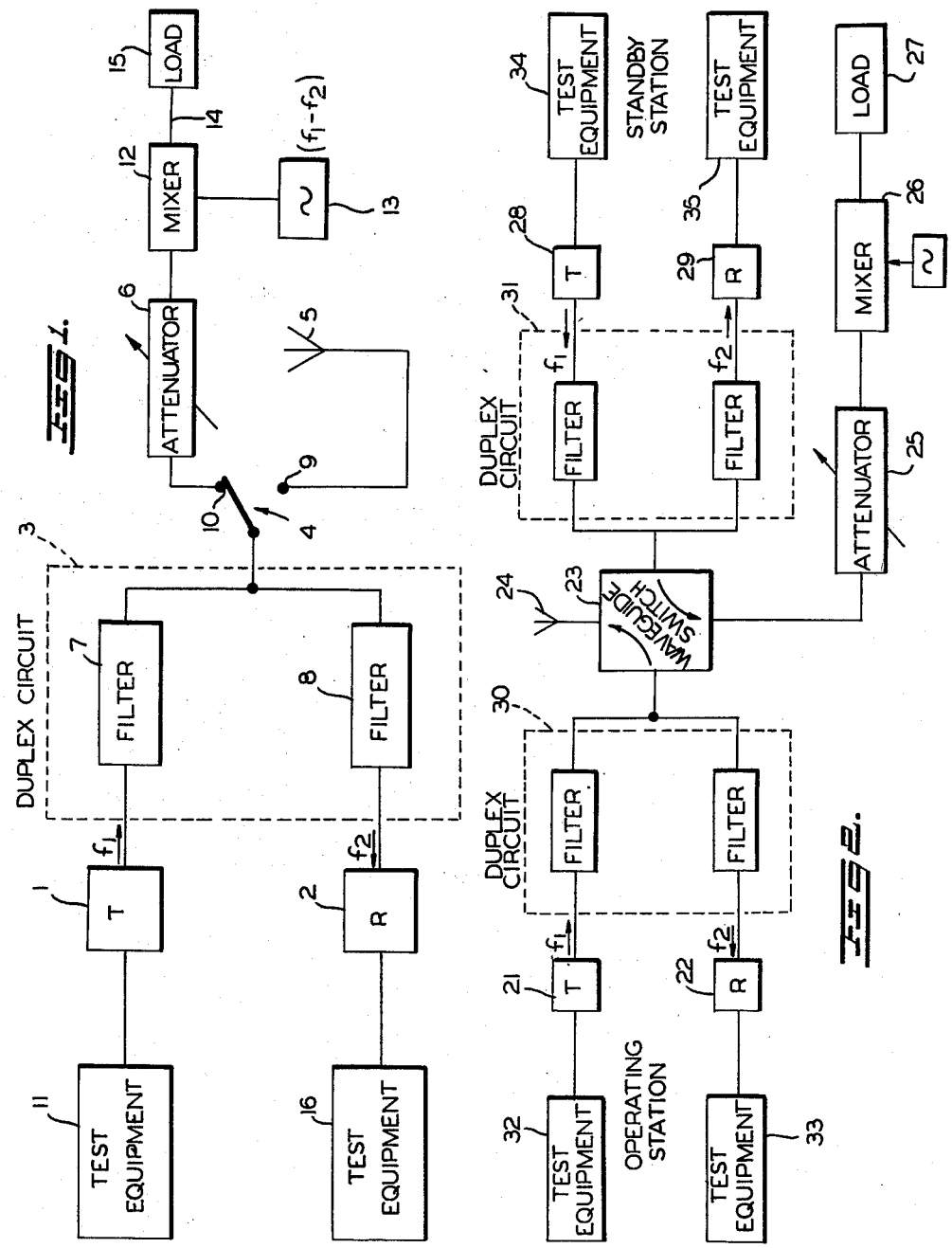

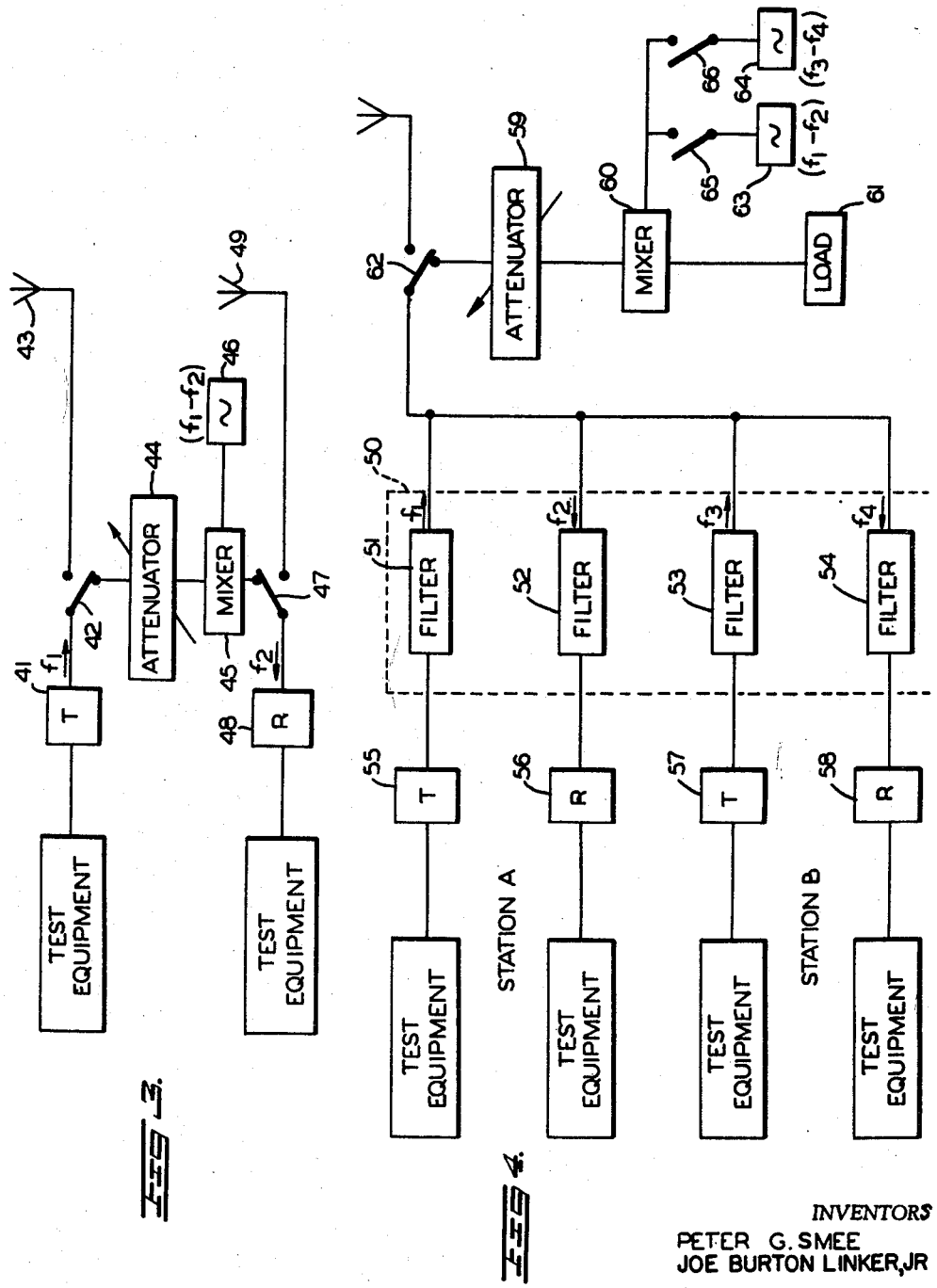

3,177,430
TEST ARRANGEMENT FOR COMMUNICATION SYSTEMS
Peter G. Smee and Joe Burton Linker, Jr., Lynchburg, Va., assignors to General Electric Company, a corporation of New York
Filed Nov. 29, 1961, Ser. No. 155,692
9 Claims. (Cl. 325—67)

This invention relates primarily to a method and apparatus for testing a communication system, and more particularly for testing a dual frequency communication system in which the transmitters and receivers of the individual stations of the system operate at different frequencies.

In any communication system, the individual stations constituting the system must be tested to determine whether their performance meets specifications. The most common procedure for testing a communication system involves operating each station in conjunction with an adjacent station. The transmitter of the station being tested transmits a signal at a frequency $f_1$ to which the receiver of the adjacent station is tuned. Similarly, the transmitter of the adjacent station transmits a signal $f_2$ to which the receiver of the station being tested is tuned. The received and transmitted signals are then utilized to determine various station operating characteristics, such as transmitter and receiver frequency response, distortion, sensitivity, etc. Such a test procedure, however, requires test personnel and equipment at both the test station and the adjacent station. There is obviously a problem in coordinating the operations of the two stations, the tests are time consuming and expensive, and any variances in the characteristics of the transmitters and receivers introduces errors in testing the individual stations.

Accordingly, it is a principal object of this invention to provide an improved test arrangement for testing individual stations of a communication system, wherein the complete test can be performed at one station and does not require other station facilities.

A further object of this invention is to provide an improved test apparatus for a communication system of high accuracy and which requires less personnel, time, and test equipment.

Other objects, features, and advantages of the invention will become apparent as the description thereof proceeds.

The various objects and advantageous features of this invention are carried out in one form of the invention by testing at a single location the individual stations of a two-way communication system in which the station transmitter and receiver operate at different frequencies $f_1$ and $f_2$. In one embodiment, the output of the transmitter $f_1$ is converted to the receiver frequency $f_2$ by mixing the signal with a local oscillator signal equal to the difference frequencies $|f_1-f_2|$ between the transmitter and receiver frequencies. The converted signal is then applied to the receiver wherein various characteristics of the received signal may be measured to determine the various operating characteristics of the transmitter and receiver.

The novel features which are believed to be characteristic of this invention are set forth with particularity in the appended claims. The invention itself, however, both as to its organization and method of operation, may best be understood by reference to the following description taken in connection with the accompanying drawings in which:

FIG. 1 is a block diagram of a preferred embodiment of the invention for testing a station of a communication system;

FIG. 2 is a block diagram of a test arrangement for a communication system having a normally operating station and a standby station;

FIG. 3 is a block diagram of a test arrangement for a communication system of the type having a station with separate transmitter and receiver antennas; and FIG. 4 is a block diagram of an arrangement for testing a plurality of stations at a single location.

The invention will be readily understood by reference to FIG. 1, wherein an arrangement is shown for testing stations of a communication system in which the transmitter and receiver of each system station operate on different frequencies. A transmitter 1 which generates signals at frequency $f_1$ and receiver 2 tuned to frequency $f_2$ are selectively connected through a duplex circuit 3 and a switching means such as a two-position switch 4 to a common antenna 5 and a variable attenuator 6. Duplex circuit 3 may, for example, comprise a filter 7, which passes only signals of the transmitter frequency $f_1$ and a filter 8 which passes only signals of the receiver frequency $f_2$. Duplex circuit 3 may, however, be any circuit or device which physically connects the output of the transmitter and the input of the receiver of the individual station to the attenuator 6 while electrically isolating the transmitter from the receiver. Among the various devices suitable for this purpose are conventional hybrid T's, rat races, and ferrite circulators, all of which electrically isolate the transmitter output and receiver input from each other.

Two-position switch 4 is selectively moved between contacts 9 and 10 to connect duplexer 3 either to attenuator 6 or to common antenna 5. With switch 4 in the test position at contact 10, transmitter 1 is energized to produce an output $f_1$. The characteristics of transmitted signal strength, such as frequency, etc. are measured by test equipment 11, which may include signal strength meters, frequency meters, distortion analyzers, as well as devices for measuring any other characteristic which is indicative of the performance of the station as a whole or any component. This signal passes through variable attenuator 6 and the attenuated output signal is applied to a frequency converter 12. Converter 12 may be any one of many devices suitable for this purpose, such as the crystal diode mixers commonly used in communication systems operating in the microwave frequency range. A second signal equal to the difference between the transmitter and receiver frequencies ($f_1$ and $f_2$), from a local oscillator 13 is applied to mixer 12 to produce a beat frequency signal of receiver frequency $f_2$. Frequency converting mixer 12 may be connected through a suitable transmission line 14 to a terminal load 15 in order to absorb that portion of the power at $f_1$ which is not converted to $f_2$ in the frequency converting mixer. The characters of the signal received by receiver 2 are measured by test equipment 16, which may include signal strength meters, distortion analyzers, frequency meters, intermodulation test sets, etc., in order to determine various transmitter and receiver performance characteristics such as sensitivity, frequency response, distortion, intermodulation, or, in fact, any other performance characteristic of the system. For example, receiver and transmitter sensitivity may be determined by measuring the net path loss in the test apparatus. That is, during the test operation of the station, transmitter signal $f_1$ passes through the variable attenuator 6, is converted in mixer 12, and is reflected back through the attenuator 6 to receiver 2. A figure for the overall system efficiency or quality can, therefore, be obtained from the net path loss in the station. The net path loss from transmitter 1 to receiver 2 is given by:

$$N.P.L. = 2X + C.L. \tag{1}$$

$X$=the value of the setting of the variable attenuator
$C.L.$=the conversion loss of the mixer and the load.

Thus it is possible to obtain a measurement of the sensitivity by setting the transmitter output to a certain signal strength and varying attenuator 6 until a signal is clearly detected at receiver 2. From the setting of the variable attenuator 3, the value of the conversion loss in mixer 13, and losses in load 17, losses which may be easily ascertained either by calculation or by test procedures, it is possible to determine the net path loss and, hence, the sensitivity of the equipment.

It is obvious to those skilled in the art that net path loss may be determined by using a fixed attenuator and that frequency converting apparatus other than crystal diode mixers may be used to convert the transmitter signal frequency $f_1$ to the receiver signal frequency $f_2$. Parametric frequency converting devices such as parametric "up" converters or parametric "down" converters, and other suitable devices, are examples of alternative equipments which may obviously be utilized.

FIG. 2 shows the test arrangement of FIG. 1 utilized in a communication system which includes a "standby" station in addition to the normal operating station. The operating station is connected through one arm of a wave guide switch 23 to a common antenna 24, while the standby station is connected through another arm of the wave guide switch 23 to variable attenuator 25 and thence to mixer 26 and load 27. The operating and standby stations are identical in construction and include transmitters 21 and 28, receivers 22 and 29, operating at frequencies $f_1$ and $f_2$, duplexers 30 and 31, as well as associated test equipments 32, 33, 34 and 35.

The operation for testing overall transmission and reception of the operating station or the standby station is the same as described with respect to FIG. 1. The arrangement shown in FIG. 2 permits personnel to test the operating station at any time by means of the test arrangement of the invention. By merely reversing the arms of the wave guide switch 23, it is possible to connect the standby station to the common antenna 24 for operation, and the operating station to the test arrangement. It is obvious that any reversible switch means may be used in place of the wave guide switch 23 with the choice being dictated to some extent by the operating frequency of the particular communication system which is being tested. Thus if the system operates in the microwave frequency range, i.e., from several hundred to several thousand megacycles, it may be well to use a wave guide switch. Once again the outstanding advantage of the test arrangement of the invention is that it permits quick and easy testing of the performance characteristics of a station with test equipment located at that station and without seriously interrupting its operation.

FIG. 3 shows the test arrangement of FIG. 1 modified to operate with a system having separate transmitting and receiving antennas. With separate antennas no duplexers are required since there is no common transmission path for the transmitter and receiver signals. Transmitter 41 is connected through a two-position switch 42 either to transmit antenna 43 or to variable attenuator 44. With switch 42 in the test position, variable attenuator 44 attenuates transmitter signal $f_1$ and impresses the attenuated signal on frequency converting mixer 45. A local signal equal to the difference between the receiver and transmitter frequencies $(f_1-f_2)$ from local oscillator 46 is also impressed on mixer 45 to produce a beat frequency signal of receiver frequency $f_2$. The output of mixer 45 is connected by means of two-position switch 47 to receiver 48.

In this test arrangement, the sensitivity of the receiver may again be determined from the net path loss. However, in this case, the net path loss is equal to:

$$N.P.L.=X+C.L. \qquad (2)$$

where $X$ = the setting of attenuator 44
$C.L.$ = conversion loss in the mixer.

This equation differs from Equation 1, since only the transmitter signal $f_1$ passes through the attenuator. Once again the transmitter is adjusted to produce a given output signal strength and attenuator 44 is varied until a clear signal is received at receiver 48. Since the setting of variable attenuator 48 is known and the conversion loss in mixer 45 is also known, or readily ascertainable, the net path loss and hence, the system sensitivity is easily determined. For normal operation, switch 42 is moved to connect transmitter 41 to antenna 43, and switch 47 is moved to connect receiver 48 to antenna 49.

FIG. 4 shows a test arrangement for a communications system having a plurality of stations at one location. Each of stations A and B, etc., includes a transmitter and receiver operating at different frequencies with the transmitter and receiver of each station differing in frequency from those of other stations. A duplex circuit 50, having a plurality of filters 51, 52, 53 and 54, is coupled between the stations and the test equipment. The filters are tuned to pass signals $f_1$, $f_2$, $f_3$ and $f_4$ to and from transmitters and receivers 55–58. Attenuator 59, mixer 60, and load 61 are connected to duplexer 50 through a two-position switch 62 and operate as described above with respect to FIG. 1. Two individually actuated local oscillators 63 and 64 are provided to supply local signals of either $(f_1-f_2)$ or $(f_3-f_4)$. When station A is being tested, switch 65 is closed connecting the oscillator 63 to mixer 60 while switch 66 remains open. Similarly, when station B is being tested switch 66 is closed connecting the oscillator 64 to mixer 60 and switch 65 is open.

With oscillator 63 connected to mixer 60 a beat frequency signal $f_2$ is reflected from mixer 60 and load 61 to filter 52 and receiver 56. Similarly, with oscillator 64 connected to mixer 60 beat frequency signal $f_4$ is reflected from mixer 60 and load 61 to filter 54 and receiver 58. Once again, the performance characteristics of the station may be determined from the associated test equipment by measuring net path loss, distortion, frequency response, intermodulation, etc. By way of example, measuring the net path loss provides an indication of the system sensitivity. The magnitude of the net path loss N.P.L. is defined by the equation $$N.P.L.=2X+C.L.$$

where X is the value to which the variable attenuator has been set in order to obtain an audible signal at the respective receivers, and C.L. is the measure of the conversion loss of the test mixer and losses in the load. It would be obvious to one skilled in the art that a single variable frequency oscillator may be used in place of oscillators 63 and 64 for producing the difference signals $(f_1-f_2)$ and $(f_3-f_4)$. It will also be apparent that the switches illustrated in FIGS. 1–4 for selectively connecting the transmitters and receivers to the test equipment or the antennas are not indispensable elements of the circuit. Although multiposition switches are a great convenience, the same results may obviously be achieved merely by unplugging or disconnecting the transmission lines to the antenna and connecting the test equipment to the station.

Although particular embodiments of the subject invention have been described, many modifications may be made and it is understood to be the intention of the appended claims to cover all such modifications that fall within the true spirit and scope of the invention.

What is claimed as new and desired to be secured by Letters Patent is:

1. A test arrangement for testing a duplex communication system at a single location including a transmitter and receiver operating at different frequencies, comprising,
    (a) an attenuator,
    (b) duplex circuit means continuously connecting the output of said transmitter and the input of said receiver to the input of said attenuator while simultaneously isolating said transmitter output from said receiver input,
    (c) a mixer, (d) means to connect the output of said attenuator to said mixer, (e) means to connect a signal equal to the difference in frequency between the transmitter signal and the frequency of a signal from a remote transmitter to said mixer to convert the transmitter signal to a signal of the same frequency as the signal from a remote transmitter which is equal to receiver signal frequency, (f) means to reflect said converted signal of receiver signal frequency back through said attenuator to said duplex circuit means and said receiver input, (g) means to measure the transmitted signal parameters, and (h) means to measure the received signal parameters.

2. A test arrangement for testing at a single location a transmitter and a receiver operating at different frequencies, comprising (a) an attenuator, (b) duplex circuit means continuously connecting the output of said transmitter and the input of said receiver to the input of said attenuator while simultaneously isolating said transmitter output from said receiver input, (c) a mixer, (d) means to connect the output of said attenuator to said mixer, (e) means to connect a signal equal to the difference in frequency between the transmitter signal and the signal from a remote transmitter to said mixer to convert the transmitter signal to a signal of the same frequency as a signal from the remote transmitter which is equal to receiver signal frequency, (f) load means to reflect said converted signal of receiver signal frequency back through said attenuator to said duplex circuit means and said receiver input and to absorb signals of transmitter frequency, (g) means to measure the transmitted signal strength, and (h) means to measure the received signal strength.

3. The test arrangement according to claim 1, wherein the said attenuator is variable.

4. A test arrangement for testing a duplex communication system including at least one operating unit and one standby unit with each unit having a transmitter operating at one frequency and a receiver operating at another frequency, equal to the transmission frequency of a remote transmitter, the combination comprising, (a) first duplex circuit means having common output terminals and means for continuously connecting the output of the operating unit transmitter and the input of the operating unit receiver to said common terminals while simultaneously isolating said operating unit transmitter output from said operating unit receiver input, (b) second duplex circuit means having common output terminals and means to continuously connect the output of the standby unit transmitter and the input of the standby unit receiver to the common terminals while simultaneously isolating the standby unit transmitter output from the standby unit receiver input, (c) a mixer, (d) means to connect a signal equal to the difference in frequency between a transmitter signal and a signal from a remote transmitter to said mixer to convert a transmitter signal to a converted signal of the same frequency as a signal from a remote transmitter which is equal to receiver signal frequency, (e) an antenna, (f) selecting switch means connected to the respective common output terminals of said first and second duplex circuit means and to said antenna and said mixer, (g) said selecting switch means being operative to connect the common output terminals of the first duplex circuit means to said mixer and the common output terminals of said second duplex circuit means to said antenna in one position and to connect the common output terminals of said second duplex circuit means to said mixer together with the common output terminals of said first duplex circuit means to said antenna in another position, (h) means connected to said mixer to reflect converted signals back to said switch means and the connected one of said duplex circuits, (i) means to measure the transmitted signals at each of said operating and standby units, and (j) means to measure the received signal at each of the operating and standby units.

5. A test arrangement for testing a duplex communication system including at least one operating unit and one standby unit with each unit having a transmitter operating at one frequency and a receiver operating at another frequency and the transmitter frequency of the operating unit being equal to the transmitter frequency of the standby unit and the receiver frequency of the standby unit being equal to the receiver frequency of the operating unit comprising, (a) first duplex circuit means having common terminals and means for continuously connecting the output of the operating unit transmitter and the input of the operating unit receiver to said common output terminals and simultaneously isolating said operating unit transmitter output from said operating receiver input, (b) second duplex circuit means having common output terminals and means to continuously connect the output of said standby unit transmitter and the input of the standby unit receiver to said common output terminals while simultaneously isolating the standby unit transmitter output from the standby unit receiver input, (c) an attenuator, (d) a mixer, (e) means to connect the output of said attenuator to said mixer, (f) means to connect a signal equal to the difference in frequency between the transmitter signal and the signal from a remote transmitter to said mixer to convert the transmitter signal to a signal of the same frequency as a signal from a remote transmitter which is equal to receiver signal freqnuecy, (g) an antenna, (h) selecting switch means connected to the respective common output terminals of said first and second duplex circuit means and to said antenna and the input of said attenuator, (i) said selecting switch means being operative to connect the common output terminals of the first duplex circuit means to said attenuator and the common output terminals of said second duplex circuit means to said antenna in one position and to connect the common output terminals of said second duplex circuit means to said antenna together with the common output terminals of said first duplex circuit means to said antenna in another position, (j) means connected to said mixer to reflect converted signals of receiver signal frequency back to said switch means and the connected one of said duplex circuits, (k) means to measure the transmitted signal at each of said operating and standby units, and (l) means to measure the received signal at each of said operating and standby units.

6. A test arrangement for testing a duplex communication system including a transmitter operating at one frequency, and (a) a receiver at another frequency equal to the transmission frequency of a remote transmitter, (b) a transmitter antenna, (c) a receiver antenna, (d) first switch means connected to said transmitter having at least a first and second position and connecting said transmitter antenna to said transmitter in one position,
(e) a second switch means connected to said receiver having at least a first and second position and connecting the receiver antenna to the receiver in one position,
(f) a mixer,
(g) means connecting said mixer to said first switch means in the other position,
(h) means to connect a signal equal to the difference in frequency between the transmitter and the signal from a remote transmitter to said mixer to convert the transmitter signal to a signal of the same frequency as a signal from a remote transmitter which is equal to receiver frequency,
(i) means connecting the converted output of said mixer of receiver signal frequency to said second switch means in the other position to conduct the converted output to the receiver,
(j) means to measure the transmitted signal, and
(k) means to measure the received signal.

7. A test arrangement for testing a duplex communication system including a transmitter operating at one frequency, and
(a) a receiver at another frequency equal to the transmission frequency of a remote tranmsitter,
(b) a transmitter antenna,
(c) a receiver antenna.
(d) first switch means connected to said transmitter having at least a first and second position and connecting said transmitter antenna to said transmitter in one position,
(e) a second switch means connected to said receiver having at least a first and second position and connecting said receiver antenna to said receiver in one position,
(f) an attenuator,
(g) means connecting the input of said attenuator to said first switch means in the other position,
(h) a mixer,
(i) means connecting the output of said attenuator to said mixer,
(j) means to connect a signal equal to the difference in frequency between the transmitter signal and the signal from a remote transmitter to said mixer to convert the transmitter signal to a signal of the same frequency as a signal from the remote transmitter which is equal to receiver frequency,
(k) means connecting the converted output of said mixer of receiver signal frequency to said second switch means in the other position to conduct the converted output of the mixer to the receiver,
(l) means to measure the transmitted signal, and
(m) means to measure the received signal.

8. A test arrangement for testing the individual stations of a duplex communication system comprising at least two stations,
(a) the first station having a transmitter operating at a first frequency and a receiver at a second frequency equal to the transmission frequency of a remote transmitter,
(b) a second station having a transmitter operating at a third frequency and receiver at a fourth frequency,
(c) an attenuator,
(d) duplex circuit means continuously connecting the outputs of said first and second station transmitters and the inputs of said first and second station receivers to said attenuator and simultaneously isolating said first and second station transmitter outputs from said first and second station receiver inputs,
(e) a mixer,
(f) means to connect the output of said attenuator to said mixer,
(g) means to connect a signal equal to the difference in frequency between the transmitter signal and the signal from a remote transmitter of the individual station being tested to said mixer to convert the transmitter signal to a signal of the same frequency as a signal from the remote transmitter which is equal to the received signal frequency of the individual station being tested,
(h) means to reflect said converted signal of received frequency back through said attenuator to said duplex circuit means and said receiver input,
(i) means to measure the transmitted signal of said first and second station transmitters, and
(j) means to measure the received signal of said first and second station receivers.

9. A test arrangement for testing the individual stations of a duplex communication system comprising at least a first and second station,
(a) the first station having a transmitter operating at a first frequency and a receiver at a second frequency equal to the transmission frequency of a remote transmitter,
(b) the second station having a transmitter operating at a third frequency and a receiver at a fourth frequency,
(c) an attenuator,
(d) a duplex circuit means continuously connecting the output of said first and second station transmitters and the input of said first and second station receivers to said attenuator and simultaneously isolating said first and second station transmitter outputs from said first and second station receiver inputs,
(e) a mixer,
(f) means to connect the output of said attenuator to said mixer,
(g) means to connect a signal equal to the difference in frequency between the transmitter signal and the signal from a remote transmitter of the individual station being tested to said mixer to convert the transmitter signal to a signal of the same frequency as a signal from the remote transmitter which is equal to receiver signal frequency of the individual station being tested,
(h) load means to reflect said converted signal of receiver frequency back through said attenuator to said duplex circuit means and said receiver input and to absorb signals of the transmitter frequency,
(i) means to measure the transmitted signal of said first and second station transmitters, and
(j) means to measure the received signal of said first and second station receivers.

References Cited by the Examiner
UNITED STATES PATENTS

| 2,788,520 | 4/57 | Arenberg et al. | 343—17.7 |
| 3,024,461 | 3/62 | Hollis | 343—17.7 |
| 3,090,955 | 5/63 | Hubka et al. | 343—17.7 |

FOREIGN PATENTS

| 670,302 | 4/52 | Great Britain. |

DAVID G. REDINBAUGH, *Primary Examiner.*

STEPHEN W. CAPELLI, *Examiner.*